United States Patent [19]

Galusky et al.

[11] 3,973,053

[45] Aug. 3, 1976

[54] PROCESS FOR TEMPERING BEADED FAT QUICKLY

[75] Inventors: Thom B. Galusky, Downers Grove, Ill.; Juan B. Ilagan, Jr., Middleburg Heights, Ohio

[73] Assignee: SCM Corporation, New York, N.Y.

[22] Filed: Sept. 24, 1975

[21] Appl. No.: 616,194

[52] U.S. Cl. ............................... 426/601; 426/99; 426/467
[51] Int. Cl.² ...................... A23B 4/10; A23L 1/22
[58] Field of Search ............... 426/99, 98, 294, 601, 426/613, 467, 471, 285, 609, 307, 312

[56] References Cited
UNITED STATES PATENTS

| | | | |
|---|---|---|---|
| 3,063,848 | 11/1962 | VanGelder | 426/467 X |
| 3,796,814 | 3/1974 | Cermak | 426/98 |

*Primary Examiner*—Raymond N. Jones
*Assistant Examiner*—R. A. Yoncoskie
*Attorney, Agent, or Firm*—Jerry K. Mueller, Jr.

[57] ABSTRACT

Polymorphic particulates formed by rapidly chilling molten fatty material to yield an unstable crystal form thereof are formed into a gas-fluidized bed wherein the gas rapidly absorbs heat of transformation of the particulates into a stabler crystalline form, and tempered particulates are withdrawn from the bed. Residual latent heat of crystallization also is absorbed by the gas and the tempered particulates resist appreciable agglomeration under conditions of storage.

8 Claims, 2 Drawing Figures

PROCESS FOR TEMPERING BEADED FAT QUICKLY

BACKGROUND OF THE INVENTION

This invention relates to the production of fatty particulates, and more particularly to a process for quickly tempering said particulates to increase their storage stability, suppressing their likelihood of agglomerating, blooming or the like.

Crystallizable fatty materials exhibit polymorphic crystal behavior, that is, they can exist in different, predominantly distinct, crystalline modifications known as $\alpha$, $\alpha'$, $\beta'$, and $\beta$. Certain ones such as lard or hydrogenated cottonseed oil tend to form $\beta'$ crystals readily; others such as hydrogenated soybean oil tend to form beta crystals. Alpha form fatty crystals are the least stable and tend to form upon rapid or sudden cooling of molten fat in massive or particulate form.

For example, molten fat can be sprayed and chilled as fine droplets, or fed to a conventially refrigerated chilling roll and removed as flakes or as a sheet of crystallized fat. Such sheet of crystallized fat then can be comminuted, e.g. by cutters, to yield particulates of the fat of desired size.

The rapidly chilled fat particulates will evolve heat due to crystal transformation thereof to a more stable crystal form. Such heat evolvement can occur within minutes after the rapid chilling operation and/or continue over extended periods of time of, for example, up to several weeks.

Hence, particulates of the rapidly chilled fat, when packaged, will tend to agglomerate appreciably under conditions of storage due to the heat evolved during such crystal transformation.

It is an object of this invention to produce fatty particulates which resist appreciable agglomeration under conditions of storage. It is another object to remove the heat of crystal transformation and latent heat of crystallization from fatty particulates before such particulates can cake, block, or agglomerate due to such heat evolvement. These and other objects, which will become readily apparent to those skilled in the art, are accomplished by the invention disclosed herein.

SUMMARY OF THE INVENTION

The instant process for tempering particulates having crystallizable, polymorphic fatty phase, at least the exteriors of said particulates having been rapidly crystallized to yield an unstable crystal form of said fatty phase, comprises: forming said particulates into a fluidized bed; supporting said particulates with cooling gas for a time sufficient for said cooling gas to absorb heat of transformation of said particulates into a stabler crystal form. The temperature of the cooling gas is less than the Wiley Melting Point of said stabler crystal form of the particulates. From the bed, spent cooling gas is vented and the tempered particulates are withdrawn.

DESCRIPTION OF THE DRAWING

The drawing shows a spray chiller and fluidized bed unit which are installed at a commercial edible oil refinery which is currently practicing the instant invention. Instrumentation, controls, feeders, tanks, fittings, and pumps and valves are not shown, but are to be provided where necessary or desirable in conventional fashion. Materials of construction of this process are conventional.

The spray of fluent fat droplets have at least their exteriors crystallized as they fall countercurrently through the rising flow of cool air. Approximately 1,000–4,000 pounds per hour of fat can be processed through the spray chiller. Average residence time of the spray droplets is less than about 1 minute. The spent air (typically at about 60°–90°F.) and entrained fines pass through overhead discharge line 16 to an exhaust system (not shown). Such exhaust system generally comprises a bag filter for collection of entrained particulates which are conveyed to a feed tank for addition to incoming fluent fatty feed. The spent air is recycled for tempering with the flow of tempered air for the apparatus.

The fatty particulates are discharged through outlet 17 and with a flow of conveying air are transported through line 18 to the gas fluidization unit. The conveying air is a portion of the tempered air flow withdrawn from line 14 (at a point in line 14 not shown). The particulates are typically about 40–80 mesh (U.S. Standard Sieve Series) and have an average bulk temperature of about 60°–75°F.

Figure 1:
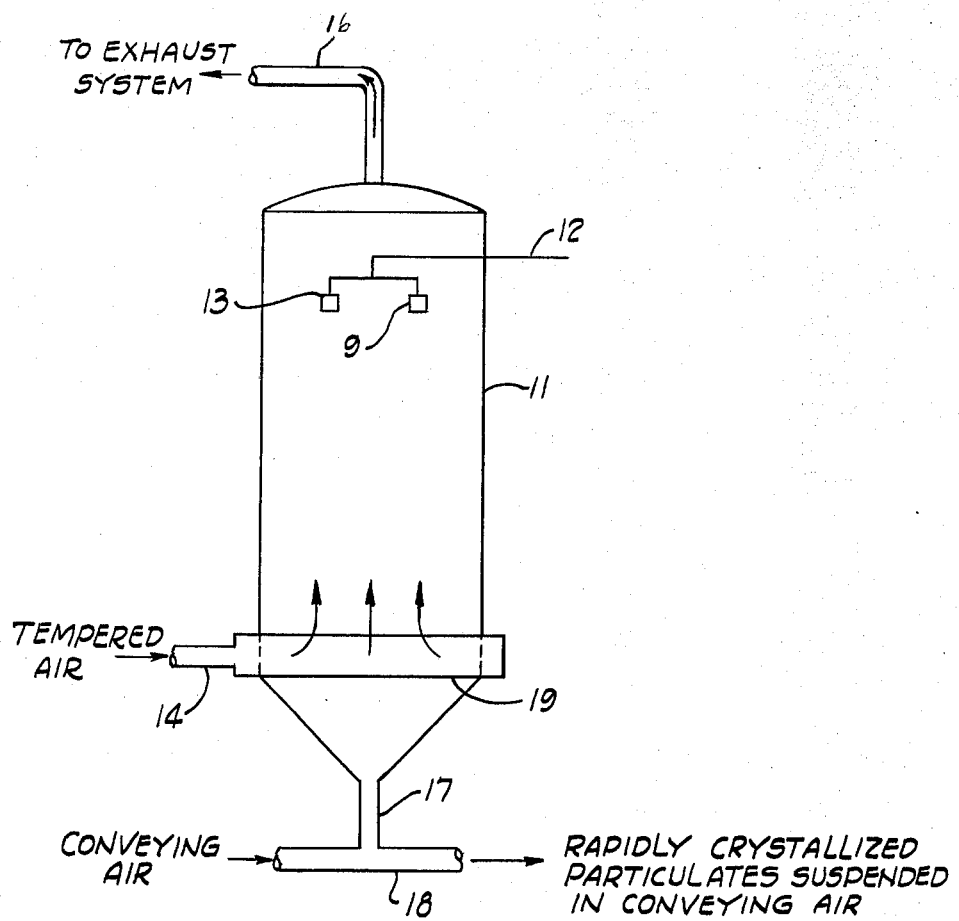
FIG. 1 shows a spray chiller schematically in vertical cross-sectional elevation. Shell 11 (the chilling zone) is a vertical cylindrical body with tapered base. Tempered air (typically 40°–60°F. and 40–80% relative humidity) enters line 14, is manifolded to air distributor 19, and flows into shell 11. Fluent fatty material enters the apparatus through line 12 and is discharged downwardly into shell 11 through nozzles 9 and 13.
Figure 2:
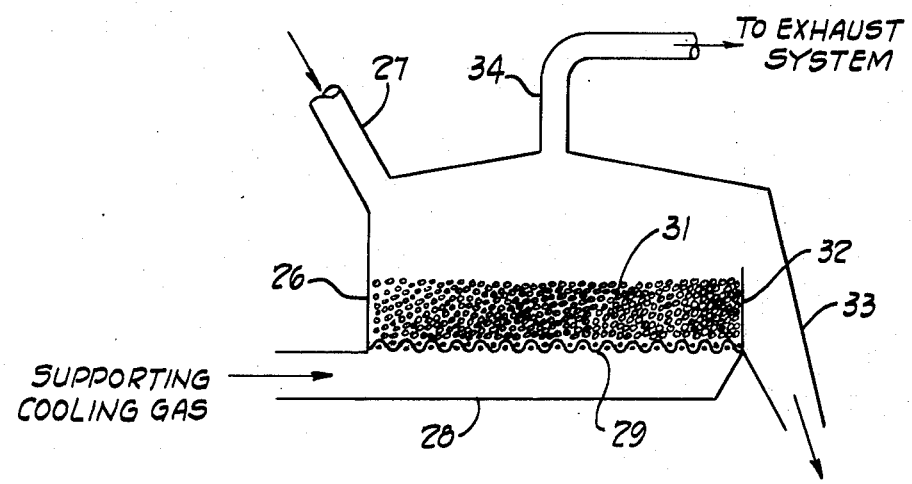

FIG. 2 shows a typical gas fluidization unit schematically in vertical cross-sectional elevator. The air-conveyed particulates in line 18 pass through a cyclone separator (not shown) for separation from conveying air, which is recycled for tempering along with the spent air from spray chiller 11.

Shell 26 is a vertical rectangular body which houses the fluidized bed of particulates 31. The particulates are admitted to bed 31 through inlet 27. Bed 31 is maintained by supporting cooling gas which enters through line 28, passes through support screen 29, and through the particulates to form bed 31. The supporting gas typically is admitted at about 50°–55°F. and is discharged through line 34 at about 75°–80°F. Entrained fines are separated from spent supporting gas by passing such flow through a bag filter (not shown).

Bed 31 height is adjusted by adjustable weir 32. The particulates remain in the bed for an average residence time of about 3–5 minutes after which they flow over weir 32 and are withdrawn through outlet 33. The withdrawn particulates have fully tempered fatty phase and have an average bulk temperature of about 70°F. Such tempered particulates are conveyed by conveying air (through lines not shown) to an air bag collector (not shown) from where they are sent directly to packaging operations.

DETAILED DESCRIPTION OF THE INVENTION

The fatty material is comprised of (1) a polymorphic fatty phase or matrix alone; or (2) said phase additional comprising condiment therein.

The polymorphic fatty phase can be an edible vegetable fat, nut fat, animal fat, so-called "low molecular" fats, free higher (e.g. $C_{12-26}$) fatty acids and corresponding alcohols, and/or a fatty food emulsifier such as a monoglyceride, diglyceride or a partial glycolate of such fatty acids, glycerol mixed esters of hydroxy carboxylic and higher fatty acids, glycol esters of such fatty acids, higher fatty acid esters of polyglycerols, tartaric acid esters of higher fatty acid monoglycerides, stearyl monoglyceridyl citrate, higher fatty acid esters of citric acid such as dipalmityl or distearyl citrate, sucrose esters of higher fatty acids, and mixtures of same. Thus, polymorphic fats for the instant purpose include triglycerides, fatty emulsifiers, and mixtures of same.

Additives which can be included as a fraction (typically a very minor fraction) of the polymorphic fats include fungistats, bacteriostats, silicone oil, and antioxidants.

The polymorphic fats are crystallizable. By a crystallizable polymorphic fat (including a mixture of polymorphic fats) is meant that such material at 90°F., advantageously at 95°F., and preferably at about 115°–118°F., is ostensibly dry to the touch, free-flowing in small (e.g. 20–100 mesh) beaded form, and such beads do not tend to agglomerate strongly or appreciably or to deform appreciably even when standing unpacked to a depth of 6 inches high in a 1-inch diameter cylinder for 24 hours at 75°–80°F.

The fatty particulates additionally can contain a condiment or mixtures thereof. The condiment-containing particulates can be a mixture or dispersion of the condiment in the fatty phase, or the condiment encapsulated by the fatty phase.

A condiment for purposes of this invention can be a liquid, vapor, or solid phase seasoning, flavoring, salting, sweetening, souring, spicing, and/or coloring ingredient or ingredient mixture suitable for producing or enhancing a flavor, texture and/or color in an edible product. It can include or consist of single or mixed pungent or spicy solids, flavoring oils, essences, oleoresins, extracts and other zesty flavorings, for example oleoresin of ginger, oils, or extracts or solid forms of sage, pimenta, coriander, parsley, garlic, caraway, nutmeg, cardamom, cloves, celery, etc. It also can include or consist of: edible titanium dioxide in permissible amounts, especially those treated in accordance with U.S. Pat. Nos. 3,592,940 and 3,579,356; monosodium glutamate; edible gums, stabilizers, and other food ingredients such as gelatin, soy protein, sodium carboxymethyl cellulose, edible "microcrystalline" cellulose, baking powder, hydroxypropyl cellulose, dextrose, sucrose, saccharin, hydrolyzed cereal solids, cornstarch, wheat flour, rice flour, breadcrumbs, and the like, and mixtures of the same.

Additionally, the polymorphic fats can be blended with frequently sticky or liquid or semi-liquid fatty emulsifiers or blends thereof, such emulsifiers being one or more alkoxylated or plain partial glycerides of edible fatty acids, lecithin, hydroxylated lecithin, alkoxylated and plain glycol esters of edible fatty acids, ethoxylated or plain sorbitol or sorbitan esters of fatty acids, and food emulsifiers in salt form such as calcium stearyl lactylic acid, mixtures thereof and the like. Such sticky, liquid, or semi-liquid fatty emulsifiers can be considered condiments for purposes of this invention.

In practicing this invention, the first step is to form the fatty particulates. Fluent fatty material, preferably, is sprayed (atomized) by conventional means, for example, airless spray, gas-assisted spray, spinning disk, or the like. Average particle size (diameter) for spraying can be as low as a few microns on up to 100 microns or even larger. While certain product particles preferably are at about 5 microns (average), many product particles are advantageously about 80–90 microns a average diameter. Thus, the atomizing nozzles used are made to produce such size, and solids used are, of course, fine enough to preclude nozzle stoppage.

When condiments or other additives are blended with the polymorphic fats, such fluent blend can be sprayed in the form of droplets or beads. Preferably, however, when encapsulating condiment with the fat, it is of advantage to produce such encapsulated particulates according to the Johnson et al process. U.S. Ser. No. 493,324, filed on July 31, 1974, the disclosure of which is incorporated expressly herein by reference. The Johnson et al process sprays liquified condiment (e.g. condiment in fat) as a spray pattern of condiment-rich droplets and intercepts the spray pattern with fluent fat directed for enveloping such spray pattern. The enveloped particulates then are passed into a chilling zone wherein at least their fatty exteriors are crystallized.

Typically, the fluent fat admitted to the spray chiller is at about 130°–180°F. depending upon the particular type of fat being handled and its corresponding melting point. The sprayed particles generally are cooled to a temperature of about 65°–90°F. in the chilling zone. This quick-chilling causes the polymorphic fat to crystallize in a predominantly unstable crystal form.

Such crystallizing in the chilling zone preferably is accomplished by heat transfer to cool air for efficiency and economy. However, any suitable cooling means can be utilized according to the precepts of this invention. The cool air preferably can pass countercurrently to the particles in the chilling zone for efficiency and economy. However, when the final particle size (effective diameter) becomes as small as 5–50 microns, a cocurrent chilling stream is preferred because the particles are in fine particulate form that can be carried along well in a medium velocity stream of air. Thus, the cooling gas stream can be countercurrent, cocurrent, or cross-current to the spray particles as is necessary or desirable (e.g., to resist or promote classification).

The particulates withdrawn from the chilling zone are formed into a fluidized bed with the support of cooling gas. Such gas fluidization of the particulates can be practiced in conventional fashion, such as described in Kirk-Othmer, *Encyclopedia of Chemical Technology*, Second Edition, Vol. 9, p. 398, Interscience Publishers, New York, New York (1966), the same being incorporated herein by reference.

Typically, the fluidized bed of fatty particulates is formed by forcing gas, preferably air for efficiency and economy, therethrough to maintain the particulates in gas-suspended condition. A fluidized bed is especially efficient with respect to heat transfer from the particulates to the fluidizing air because particulates are in continuous motion and virtually the entire surface of each particulate is exposed to the air. The particulates in the bed are significantly resistant to agglomerating due to the heat they can evolve because they are in gas-suspended condition and free of direct contact for any significant length of time.

The cooling air fed to the bed is at an appropriate inlet temperature such that when the cooling air absorbs the heat of transformation of the particulates, the outlet temperature of the cooling air is less than the Wiley Melting Point of the stabler crystal form of the polymorphic fatty phase of the particles and, preferably, less than the particulates temperature upon admittance to the bed. Preferably, then, the final temperature of the particulates withdrawn from the bed is less than about their initial temperature upon entry to the bed. It must be recognized that the final temperature of the particulates withdrawn from the bed may be greater than their bed entrance temperature and the particles still be "cooled" by the fluidized bed step (i.e. evolved heat of crystal transformation of the particulates being absorbed by the cooling air). So long as the final temperature of the particulates from the bed is less than the Wiley Melting Point of the resulting more stable crystal form, such particulates will be in discrete particulate form and resistant to appreciable agglomeration upon their collection. The temperature of the particulates is the bulk temperature thereof for the instant purposes.

The particulates withdrawn from the bed will be resistant to appreciable agglomeration when, upon their collection and at the collection temperature, such product particles will resist appreciable blocking, caking, and agglomeration, even when standing unpacked to a depth of 6 inches high in a 1 inch diameter cylinder for 24 hours. They will tend to be free-flowing.

Additionally, a portion of the inner portion (or core) of the particulates withdrawn from the spray chilling zone may be only partially crystallized or entirely fluent. Such particulates will tend to completely crystallize in the fluidized bed upon exposure to the cooling air, the air absorbing the heat evolved by such particulates thereby.

The amount of fluidizing air (cooling gas) admitted to the bed should be sufficient to maintain the bed in gas-fluidized condition, and can be in a greater amount in order to supply sufficient cooling gas for rapidly absorbing the heat of transformation of the particulates. The amount of such cooling air fed to the bed, however, should be insufficient for blowing the particulates out of the bed along with the flow of spent cooling air. Typically, though, a few of the particulates may be carried along with the spent cooling air and these can be returned to the bed by directing the spent cooling gas through an appropriate trap located at the exit point of the spent cooling gas from the bed. The average residence time of the particles in the bed should be sufficient for the fluidizing air to absorb substantially all of the heat evolved by the particles therein. Generally a residence time of about 3–5 minutes is sufficient in commercial scale operations.

The spent cooling air from the bed can be at a lower temperature than the spent air from a typical spray chiller. It can be advantageous, for efficiency and economy, then, to recycle at least a portion of the spent air from the bed into the spray chiller, optionally directly into the chiller at an appropriate position thereof, or further cooled for combining with the initial tempered air to the chiller or directly admitted into the chiller as a separate flow.

The following examples show how the instant invention has been practiced, but should not be construed as limiting. In the specification all percentages are weight percentages, all parts are parts by weight, all mesh sizes are in U.S. Standard Sieve Series, and all temperatures are in degrees Fahrenheit unless otherwise expressly indicated.

EXAMPLE 1

A pilot plant scale spray chiller and gas fluidized bed unit similar in design and operation to the plant scale equipment shown in the drawing were employed to form droplets or beads of ICE 2F food emulsifier (ICE is a trademark of SCM Corporation, Glidden-Durkee Division, Cleveland, Ohio.).

The fluent food emulsifier at 160°F. was sprayed in the spray chiller to an average particle size of about 40 mesh. The tempered air flow into the apparatus was at 57°F. and was discharged at 92°F. The beads of fat were discharged at a bulk temperature of 86°F.

The discharged particulates then were admitted to a fluidized bed unit which utilized supporting cooling air admitted at about 50°–56°F. (45% relative humidity at 72°F.) and discharged at about 67°–68°F. The particulates remained in the bed for an average residence time of about 15 minutes and were withdrawn from the bed at an average bulk temperature of about 77°–80°F. The product fatty particulates were fully tempered and could be packaged immediately.

EXAMPLE 2

A batch of the product fatty particulates of Example 1 and a substantially identical batch of fatty particulates which were formed in the same spray chiller, but not treated in the fluidized bed, were packaged and their resistance to agglomeration compared.

Each of the two batches were packaged in 200-pound drums and stored at room temperature (about 72°F.) and 45% relative humidity. The drums also were stored upside down so that the samples taken were equivalently from the bottom of each drum. The following table shows the results of the storage stability tests for the untreated (control) particulates and the treated particulates of the present invention as a function of the amount (weight percent) of particulates agglomerated over extended periods of storage.

TABLE

| STORAGE TIME (Weeks) | UNTREATED PARTICULATES Weight % Retained on 40-Mesh Screen | TREATED PARTICULATES Weight % Retained on 40-Mesh Screen |
|---|---|---|
| 0 | 10.70 | 10.70 |
| 1 | 14.58 | 11.70 |
| 2 | 17.37 | 14.04 |
| 4 | 16.70 | 13.34 |
| 6 | 19.20 | 15.65 |
| 9.5 | 29.90 | 17.01 |
| 10.5 | 54.02 | 16.52 |

The above-tabled results show that the fatty particulates produced according to the present process resisted appreciable agglomeration over extended periods of storage and agglomerated much less than did the untreated control fatty particulates. The treated particulates were fully tempered by the process treatment.

We claim:

1. A process for tempering particulates having crystallizable, continuous polymorphic fatty phase, at least the exteriors of said particulates having been crystallized rapidly to yield an unstable crystal form of said fatty phase, which comprises:

forming said particulates; admitting said formed particulates into a fluidized bed; supporting said particulates with cooling gas at a temperature and for a time sufficient for said cooling gas to absorb heat of transformation of said particulates into a stabler crystal form, the outlet temperature of said cooling gas being less than the Wiley Melting Point of said stabler crystal form; venting spent cooling gas from said bed; and withdrawing tempered particulates from said bed whereby withdrawn tempered particulates resist appreciable agglomeration upon their collection.

2. The process of claim 1 wherein said fatty material comprises a fatty emulsifier.

3. The process of claim 1 wherein said fatty material comprises triglyceride fat.

4. The process of claim 1 wherein condiment is comprised in said particulates.

5. The process of claim 1 wherein said particulates are formed by spray chilling of an atomizate.

6. The process of claim 1 wherein said particulates are formed by flaking.

7. The process of claim 1 wherein the inlet temperature of said cooling gas is less than the bulk temperature of said particulates formed into said bed.

8. The process of claim 1 wherein said cooling gas absorbs remaining heat of crystallization of said particulates in said bed.

* * * * *